United States Patent [19]

Hipp et al.

[11] Patent Number: 5,032,844
[45] Date of Patent: Jul. 16, 1991

[54] SKY WAVE DIRECTION FINDER

[75] Inventors: Jackie E. Hipp; Douglas N. Travers, both of San Antonio, Tex.

[73] Assignee: Southwest Research Institute, San Antonio, Tex.

[21] Appl. No.: 326,356

[22] Filed: Mar. 21, 1989

[51] Int. Cl.[5] .............................................. G01S 5/04
[52] U.S. Cl. .................................... 342/434; 342/432
[58] Field of Search ............... 342/420, 421, 432, 442, 342/448

[56] References Cited

U.S. PATENT DOCUMENTS

2,361,436 10/1944 Taylor .................................. 342/448
3,939,477 2/1976 Green et al. ......................... 342/432

Primary Examiner—Gregory C. Issing
Attorney, Agent, or Firm—Pravel, Gambrell, Hewitt, Kimball & Krieger

[57] ABSTRACT

A system using two magnetic quadrupole antennas, two magnetic dipole antennas and means for processing the respective antenna signal outputs provides unambiguous estimates of elevation and polarization for an incident RF signal. The system uses an efficient procedure to process the signals from a small aperture array of fixed loop elements for the purpose of providing radio direction of arrival information that is free of intrinsic polarization error. The directional information is developed by performing a simultaneous arctangent operation on signals output from the antennas or as the measured phase difference between a quadrature summed quadrupole output and a quadrature summed dipole output compensated by a phase offset between the dipole antennas and the quadrupole antennas.

2 Claims, 7 Drawing Sheets

SKY WAVE DIRECTION FINDER

FIELD OF THE INVENTION

The present invention relates generally to measurement systems for determining the direction of an incoming radio signal. More specifically, the present invention provides a simple and efficient method for processing the signals from a small aperture array of fixed loop elements for the purpose of providing direction of arrival information that is free of intrinsic polarization error.

BACKGROUND

Numerous radio wave direction finding systems are known in the prior art. An early example of a direction finding system is the spaced loop direction finding system described in 1921 by Eckersly. In 1935, Eckersly and Marconi described an improved direction finding system based on a precision spaced loop which rotated. More recent sophisticated direction finding systems are shown in U.S. Pat. No. 3,093,827.

The previous fixed spaced loop systems were designed to provide accurate azimuth angle of arrival for incoming ground wave signals. However, their performance was degraded for sky wave signals having significant elevation angles with horizontally polarized electric field components. The direction finding system shown in U.S. Pat. No. 4,207,572 was designed to provide accurate azimuthal and elevation measurements on the incident signals, both for ground waves and also for multipolarized sky waves independent of elevation.

An electrically small loop is equivalent to a magnetic dipole, and can be used in a receive mode to provide partial information about electromagnetic polarization and consequently about direction of arrival for ground wave signals. Both spinning loops and fixed simple loop arrays have been successfully employed for ground wave direction finding. A properly arranged array of simple loops can also be connected to produce an equivalent magnetic quadrupole. Such magnetic quadrupoles have also been successfully used for groundwave direction finding, but suffer polarization/elevation limitations very similar to the simple loop systems.

Performing direction finding on HF radio signals which have propagated through the ionosphere (sky wave signals) requires DF systems that are free of the above described intrinsic polarization errors. Typically, such systems have been large aperture systems. However, a suitable site that is sufficiently large to accommodate large aperture systems is frequently unavailable at the desired location. To provide skywave direction finding capability with small aperture systems, several spaced loop DF systems have been developed for operation against skywave signals. These include spinning spaced loops and arrays of multiple fixed spaced loops that equivalently synthesize spinning spaced loops. The spinning spaced loop systems do not lend themselves readily to automated, unattended operation, and have the shortcomings that are typical of mechanically moving system. The skywave spaced loop array is a system of six independent outputs and requires rather complex processing to produce the unambiguous bearing.

SUMMARY OF THE INVENTION

Briefly, the present invention provides a system using two magnetic quadrupole antennas, two magnetic dipole antennas and means for processing the respective antenna signal outputs to provide unambiguous estimates of elevation and polarization for an incident RF signal. The invention system is unique in that it uses a very efficient procedure to process the signals from a small aperture array of fixed loop elements for the purpose of providing radio direction of arrival information that is free of intrinsic polarization error.

The features of the invention believed to be novel are set forth with particularity in the appended claims. The invention itself, however, both as to organization and method of operation, together with the objects and advantages thereof, may be best understood by referring to the detailed description in conjunction with the accompanying drawings.

DETAILED DESCRIPTION OF THE PREFERRED EMBODIMENT

As described herein, signals from a system of two magnetic quadrupole antennas and two magnetic dipole antennas are processed to provide unambiguous estimates of elevation and polarization. The processing can be extended to produce estimates of elevation angle of arrival and can also be extended to utilize higher order magnetic multipoles. As described below, the effect of magnetic multipole antennas can be achieved with circular arrays of small loop antennas.

DETERMINING PHASE AND AMPLITUDE RESPONSE OF A MAGNETIC DIPOLE

Both the phase and amplitude of a small loop antenna responding to an incident far field plane wave are influenced by the polarization and direction of arrival (including both azimuth and elevation) of the incident wave relative to the orientation of the loop axis. In the case of a small loop with a horizontal axis in the azimuthal direction $\phi = 0$, the phase and amplitude response ($V_D$) is described by the following relationship:

$$V_D = K_D (E_v \sin \phi + E_h \sin \theta \cos \phi) \tag{1}$$

where
$K_D$ is a phasor quantity describing the relative height and the phase insertion of the implemented magnetic dipole and associated circuitry. This term includes the phase and gain offset with respect to the reference antenna and its associated circuitry;

$E_v$ is a phasor quantity describing the relative amplitude and phase of the $\theta$ polarized electric field component of the incident wave;

$E_h$ is a phasor quantity describing the relative amplitude and phase of the $\phi$ polarized electric field component of the incident wave;

$\theta$ is the angle of incidence (i.e. 90 degrees-elevation angle) of the arriving wave;

$\phi$ is the azimuth angle of arrival of the incident wave.

DETERMINING PHASE AND AMPLITUDE RESPONSE OF A MAGNETIC QUADRUPOLE

Figure 1A:
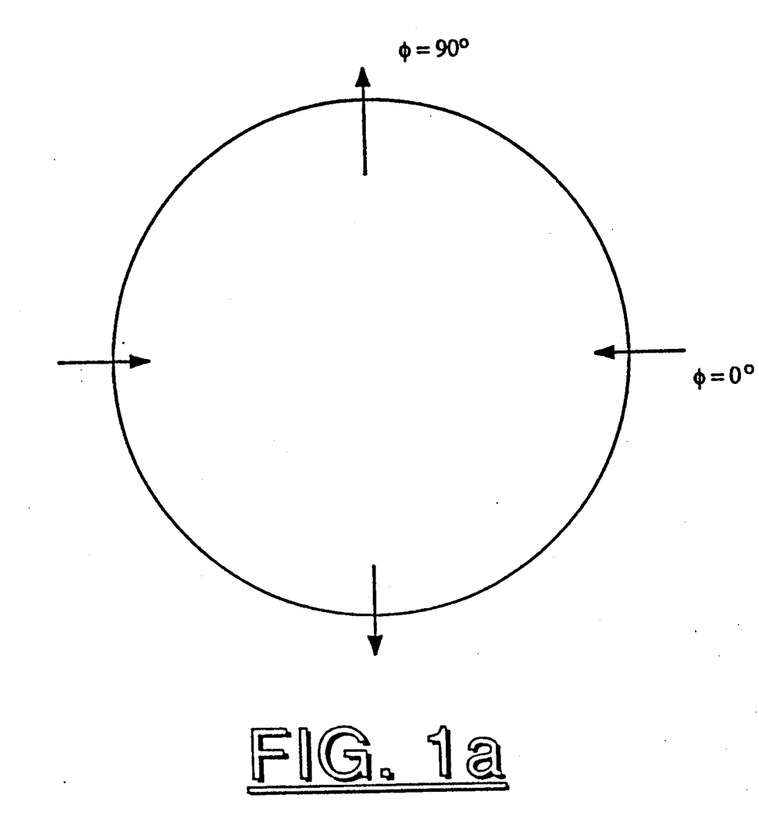
FIGS. 1a and 1b are illustrations of magnetic dipoles arrayed to produce a magnetic quadrupole.
Figure 1B:
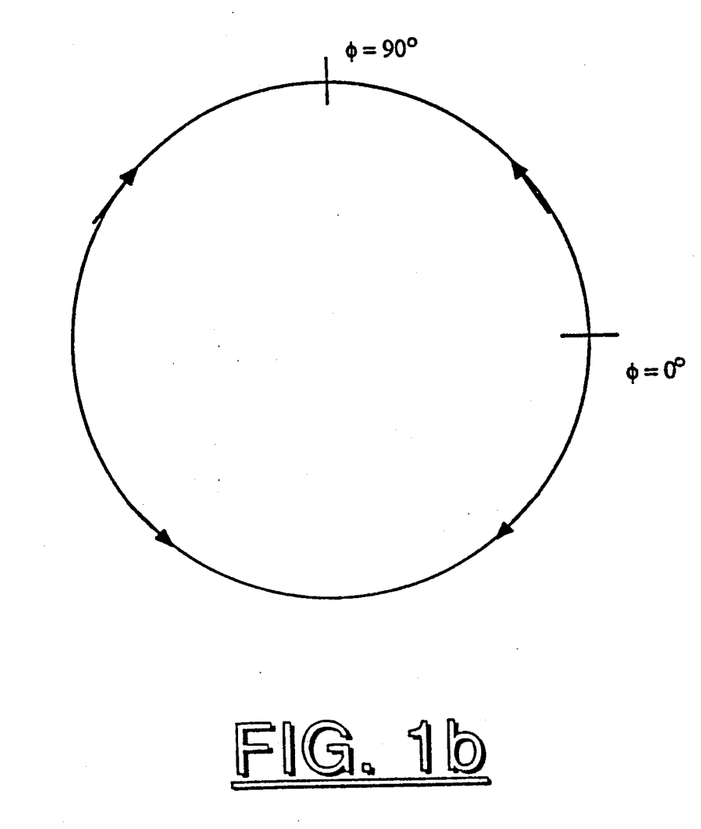

A magnetic quadrupole can be formed by a circular array of magnetic dipoles in which the dipole moment vectors are periodic. The sign and magnitude of the radial component of each magnetic dipole element are functions of the element's position in the array, and such functions of position are periodic with two complete cycles per revolution around the array. Likewise, the sign and magnitude of the azimuthal component also have two cycle periodicity around the array. The two cycle periodicity is established by positioning four equal magnitude dipoles with alternating polarities at ninety degree (90°) intervals around the array, as shown in FIGS. 1a and 1b. FIG. 1a is an illustration of a magnetic quadrupole produced by a pair of radial dipoles. FIG. 1b is an illustration of a magnetic quadrupole produced by a pair of azimuthal dipoles.

Figure 2:
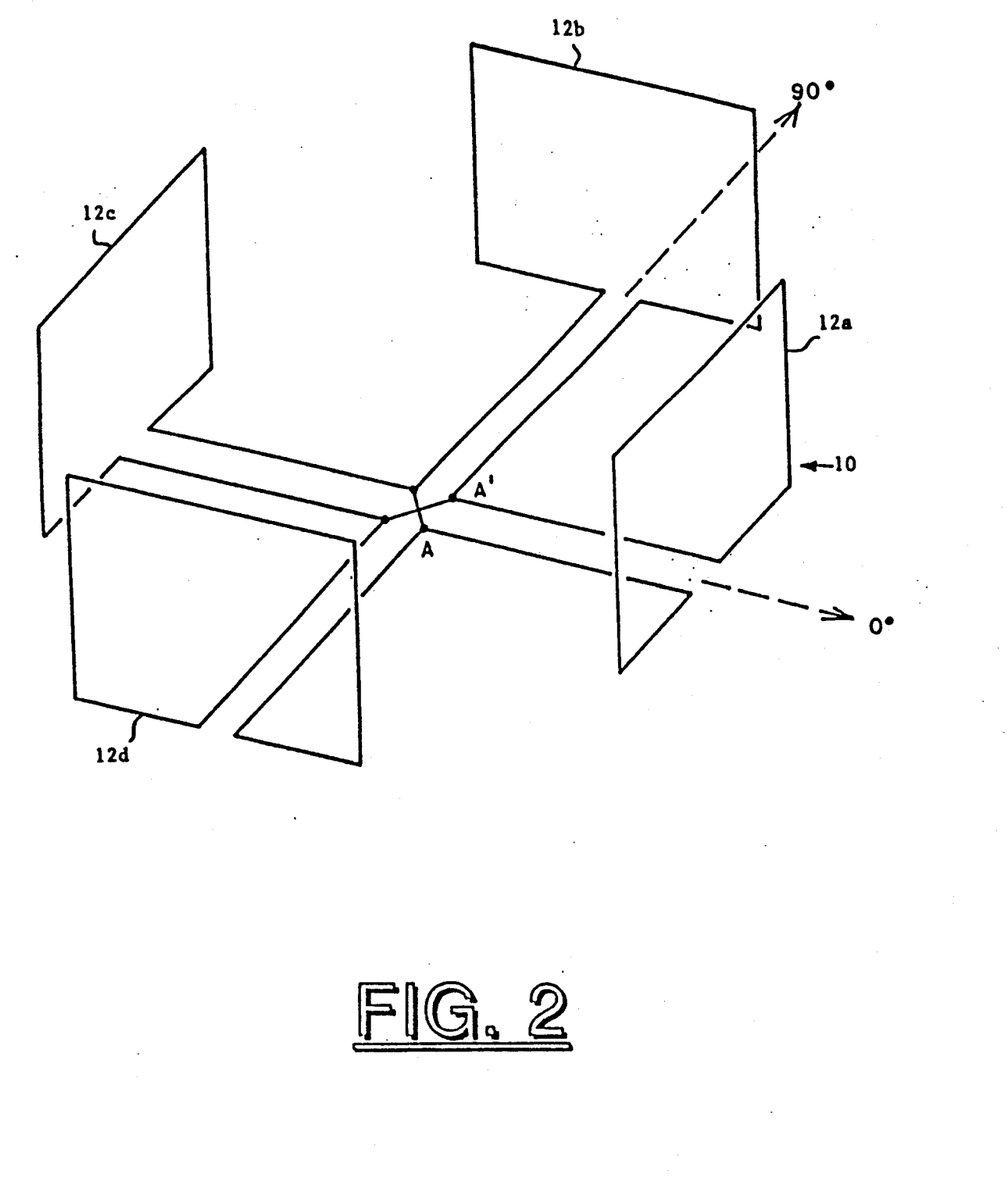
FIG. 2 is an illustration of a magnetic quadrupole produced by crossed coaxial spaced loops.
Figure 3:
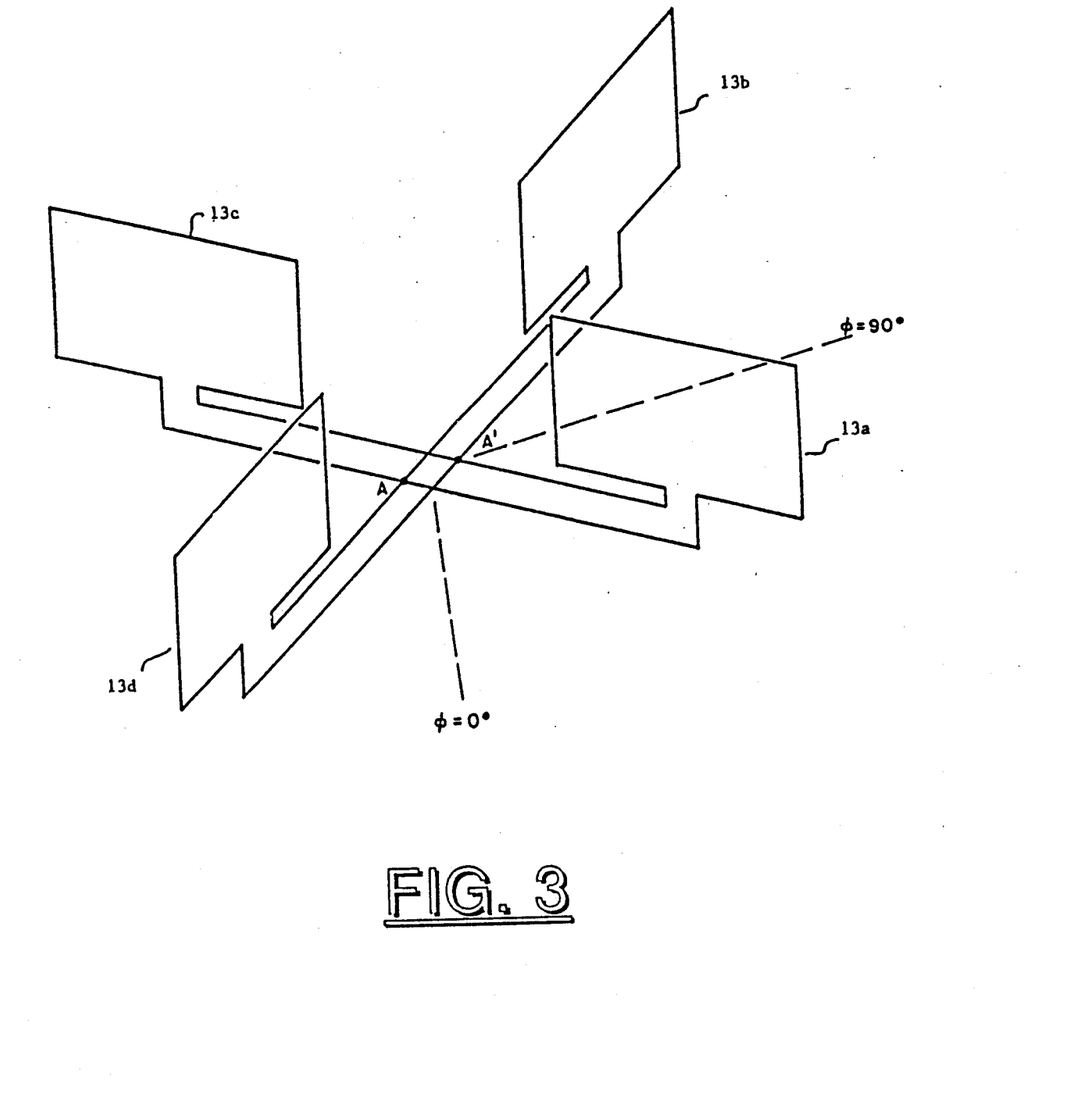
FIG. 3 is an illustration of a magnetic quadrupole produced by crossed coplanar spaced loops.
Figure 4:
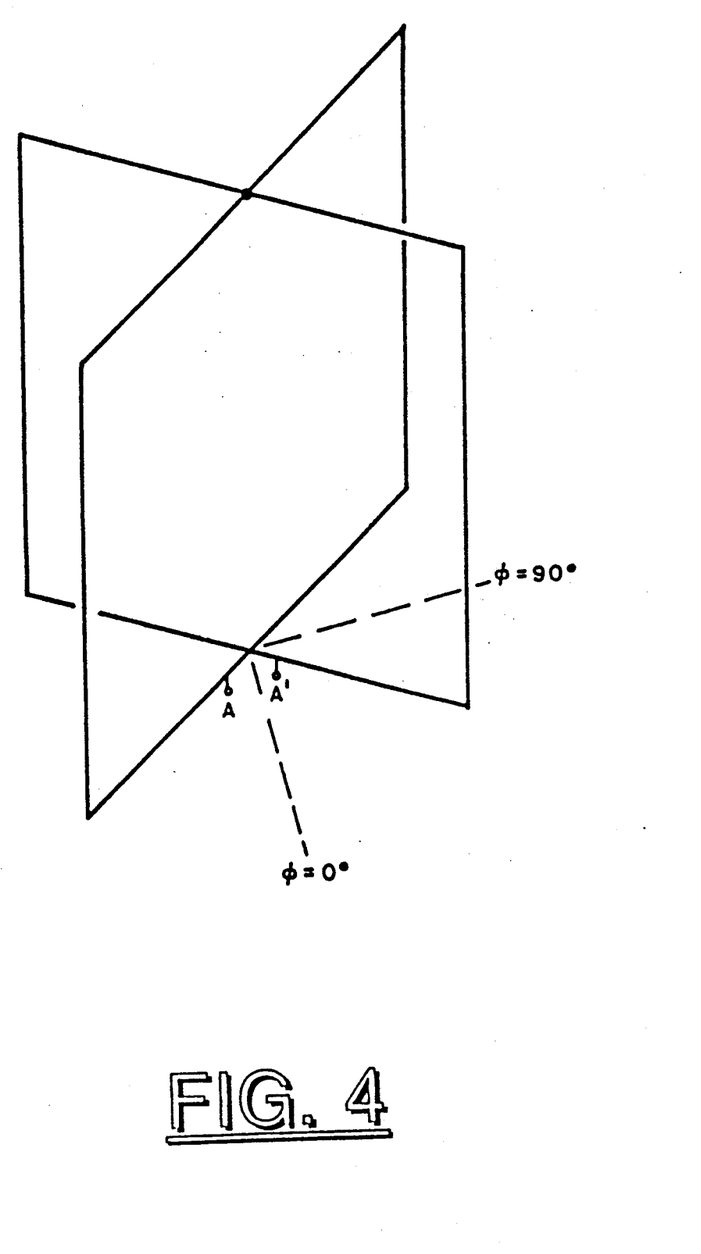
FIG. 4 is an illustration of a magnetic quadrupole produced by crossed loops.

FIGS. 2, 3 and 4 show several forms of magnetic quadrupole arrangements using electrically small loops. FIG. 2 is an illustration of a magnetic quadrupole formed from a four loop array with the individual loops labeled, respectively, as 12a-d. In FIG. 3, an alternate version of a four loop array is show with the respective loops labeled as 13a-d. In FIGS. 2 and 3, the loops are located at 90 degree (90°) intervals with alternating polarity. However, in FIG. 2, the loop axes are radial, while the loop axes in FIG. 3 are azimuthal. The array in FIG. 4 is a degenerate form of the array in FIG. 3, in which the inner legs of each loop have been merged and eliminated.

In each of the configurations illustrated, the resulting complex phasor pattern ($V_Q$) can be expressed by the following relationship:

$$V_Q = K_Q (E_v \sin\theta \sin 2\phi + 0.5 E_h \sin 2\theta \cos 2\phi) \quad (2)$$

where
$K_Q$ is a phasor quantity describing the relative height and the phase insertion of the implemented magnetic quadrupole and associated circuitry. This term includes the phase and gain offset with respect to the reference antenna and its associated circuitry.

To simplify the above equation (2), two complex parameters $A_0$ and $C$ are defined as follows:

$$A_0 = 0.5 E_h \sin 2\theta$$

$$C = E_v \sin\theta$$

Using these definitions, the above magnetic dipole and quadrupole relationships are re-written as follows:

Equation (2) as:

$$V_Q = K_Q (C \sin 2\phi + A_0 \cos 2\phi) \quad (3)$$

and Equation (1) as:

$$V_D = K_D (C \sin\phi + A_0 \cos\phi)/\sin\theta. \quad (4)$$

By invoking a common trigonometric identity for the sine of a sum, these relationships are simplified further as follows:

Equation (3) as $$V_Q = K_Q P \sin(2\phi + \gamma) \quad (5)$$

and Equation (4) as $$V_D = K_D P \sin(\phi + \gamma)/\sin\theta, \quad (6)$$

where $$\begin{aligned}\gamma &= \tan^{-1}(A_0/C).\\ &= \text{the characteristic polarization error}\\ &\quad \text{of a simple loop direction finder;}\end{aligned}$$

$$P = \sqrt{A_0^2 + C^2}.$$

Both P and $\gamma$ are complex terms. The complex term $\gamma$ describes the polarization error that is intrinsic to simple direction finders. Similarly, $\gamma/2$ describes the polarization error that is intrinsic to magnetic quadrupole direction finders.

Two magnetic dipoles can be oriented with horizontal axes at right angles to each other to provide "sine" and "cosine" outputs $V_{DS}$ and $V_{DC}$:

$$V_{DC} = K_D P \cos(\phi + \gamma)/\sin\theta \quad (7)$$

and $$V_{DS} = K_D P \sin(\phi + \gamma)/\sin\theta \quad (8)$$

Similarly, two magnetic quadrupoles can be oriented with horizontal axes at 45 degrees separation to separately provide "sine" and "cosine" outputs $V_{QS}$ and $V_{QC}$ as follows:

$$V_{QC} = K_Q P \cos(2\phi + \gamma)$$

and $$V_{QS} = K_Q P \sin(2\phi + \gamma)$$

SOLVING FOR ARCTANGENT DF

From the above relationships, it follows that if the phasor quantities $K_D$ and $K_Q$ were both "real" (i.e., if $K_D$ and $K_Q$ both have "zero" phase), then:

$$\tan^{-1}(V_{DS}/V_{DC}) = \phi + \gamma, \quad (9)$$

and $$\tan^{-1}(V_{QS}/V_{QC}) = 2\phi + \gamma \quad (10)$$

where each arctangent function must accommodate a pair of complex arguments in order to uniquely identify the proper quadrant of each intermediate solution. The proper quadrant of the solution is determined by the combination of signs of the "real" components (or equivalently, by the combination of phases) of the numerator and denominator. For example, if the "real" component of the numerator is positive while the "real" component of the denominator is negative, the solution is placed in the second quadrant.

While the estimated value of $\phi$ is ideally "real", the presence of noise, multipath, multiple signals, pattern distortions, and other sources of measurement error would produce complex values from the above formulation with complex arctangents. Under such circumstances, the "real" component of the resulting complex angle is the appropriate estimate of the direction of arrival.

For the above equations (9) and (10), it is assumed that the $K_D$ and $K_Q$ quantities are real. Since the quadrant of each arctangent solution in the above two equations (9) and (10) is uniquely determined by the combination of phases associated with the denominator and the numerator, the quadrants of the two intermediate solutions are influenced by the respective phases of $K_D$ and $K_Q$. As a consequence, the more general statement of the two above intermediate solutions (9) and (10) as follows:

$$\text{Tan}^{-1}(V_{DS}/V_{DC}) = \phi + \gamma + (n)(180°); \quad (11)$$

and $$\text{Tan}^{-1}(V_{QS}/V_{QC}) = 2\phi + \gamma + (m)(180°); \quad (12)$$

where
n is zero or one, depending upon the phase of $K_D$; and
m is zero or one, depending upon the phase of $K_Q$.

In an implemented system, the phase of $K_D$ corresponds to the system's characteristic phase offset between the magnetic dipole and a reference antenna, determined for signals arriving from azimuth $\phi = 0$. Similarly, the phase of $K_Q$ is the characteristic phase offset between the magnetic quadrupole and the reference antenna. Although it would be possible to construct an operational system so that the phases of $K_D$ and $K_Q$ were known and compensatable, such constraints can impact the selection and the placement of the reference antenna and are not necessary. Instead, it is sufficient to satisfy the lessor constraint that the characteristic phase offset between the quadrupole and the dipole be known and compensatable. If the characteristic phase of $K_Q$ with respect to $K_D$ is known and if the operationally measured phases of $V_{QS}$ and $V_{QC}$ are accordingly compensated, then equivalently, the phase of $K_Q$ is compensated to be equal to the phase of $K_D$. When the compensated phases of $K_Q$ and $K_D$ are equal, the 180 degree ambiguity factors "m" and "n" in the above equations (11) and (12) are identical regardless of the selection of reference antenna (provided, of course, that the same antenna is used as reference for all measurements).

Under the constraints that the characteristic phase offset between the magnetic quadrupole antennas and the magnetic dipole antennas is known and used to compensate the appropriate operationally measured phases, the multipolarization DF relationship to estimate the unambiguous direction of arrival $\phi$ is as follows:

$$\phi = \text{Tan}^{-1}(V_{QS}/V_{QC}) - \text{Tan}^{-1}(V_{DS}/V_{DC}) \quad (60)$$

Figure 5:
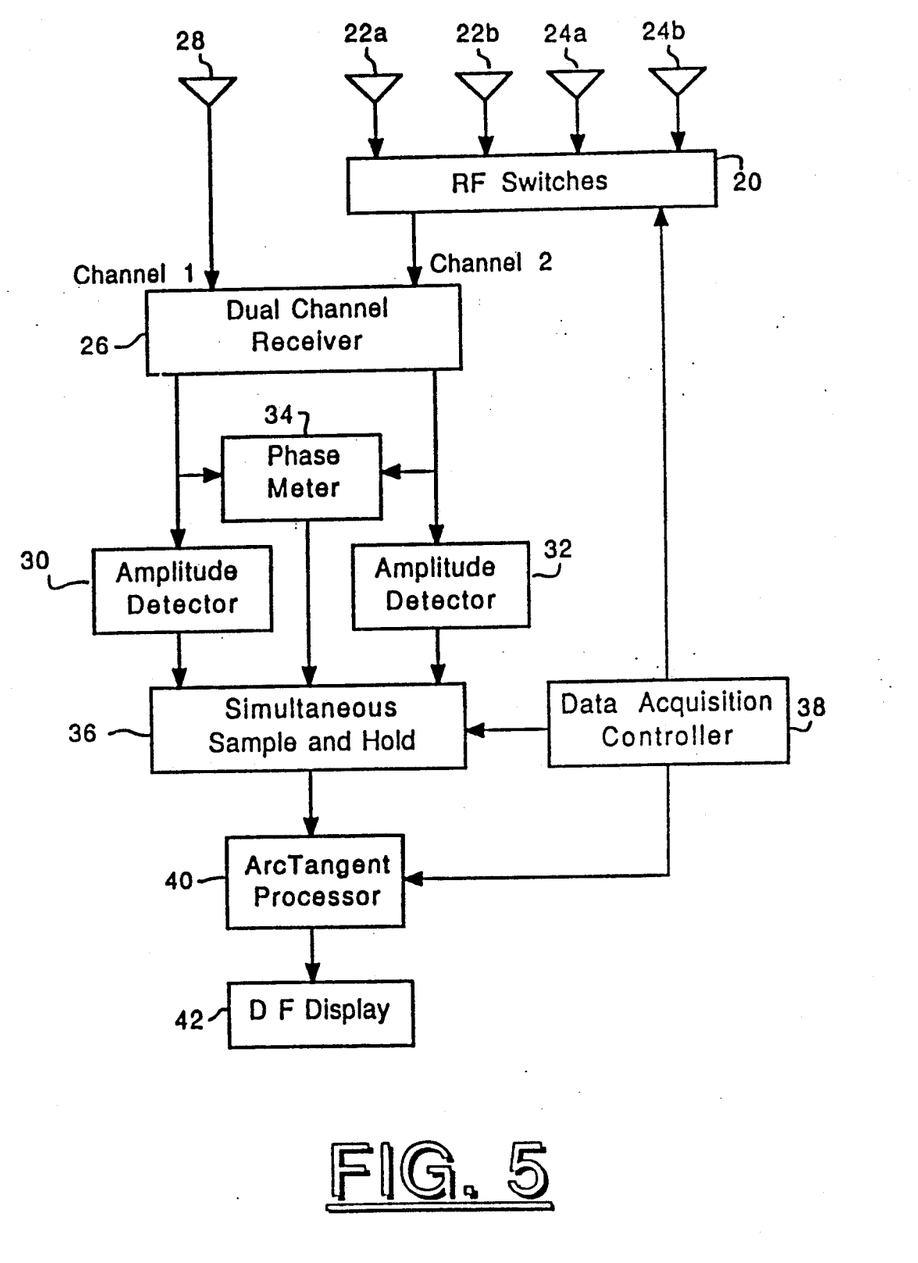
FIG. 5 is a schematic block diagram of a magnetic dipole/quadrupole sky wave direction finding system having an arctangent processor.

FIG. 5 is a block diagram of the system hardware for implementing the skywave DF system using magnetic dipoles and magnetic quadrupoles with arctangent processing. An RF switch 20 receives signals from antennas 22a-b and 24a-b and provides a sequence of switched antenna signals to a dual channel receiver 26. The receiver is also provided with a signal from a reference antenna 28. This signal serves as an amplitude and phase reference for each of the signals provided by the antennas 22a-b and 24a-b. The antennas 22a-b are magnetic quadrupoles, with 22a providing a "sine" input and 22b providing a "cosine" input. The antennas 24a-b are magnetic dipoles, with 24a providing a "sine" input and 24b providing a "cosine" input.

The receiver 26 produces a reference output signal which is supplied to amplitude detector 30 and an array output signal which is supplied to amplitude detector 32. The reference and array output signals are also provided to a phase meter 34 which produces an output signal corresponding to the phase difference between the reference signal and the array output signal. The detectors 30 and 32 provide inputs, representative of the simultaneous array/reference signal amplitudes, to a sample and hold circuit 36. The output of the sample and hold circuit is provided to an arctangent processor 40 which processes the signals in accordance with the above described relationships to provide an indication of the direction of arrival of the incoming signal. This direction indication is then displayed on an appropriate direction finder display 42.

Figure 6:
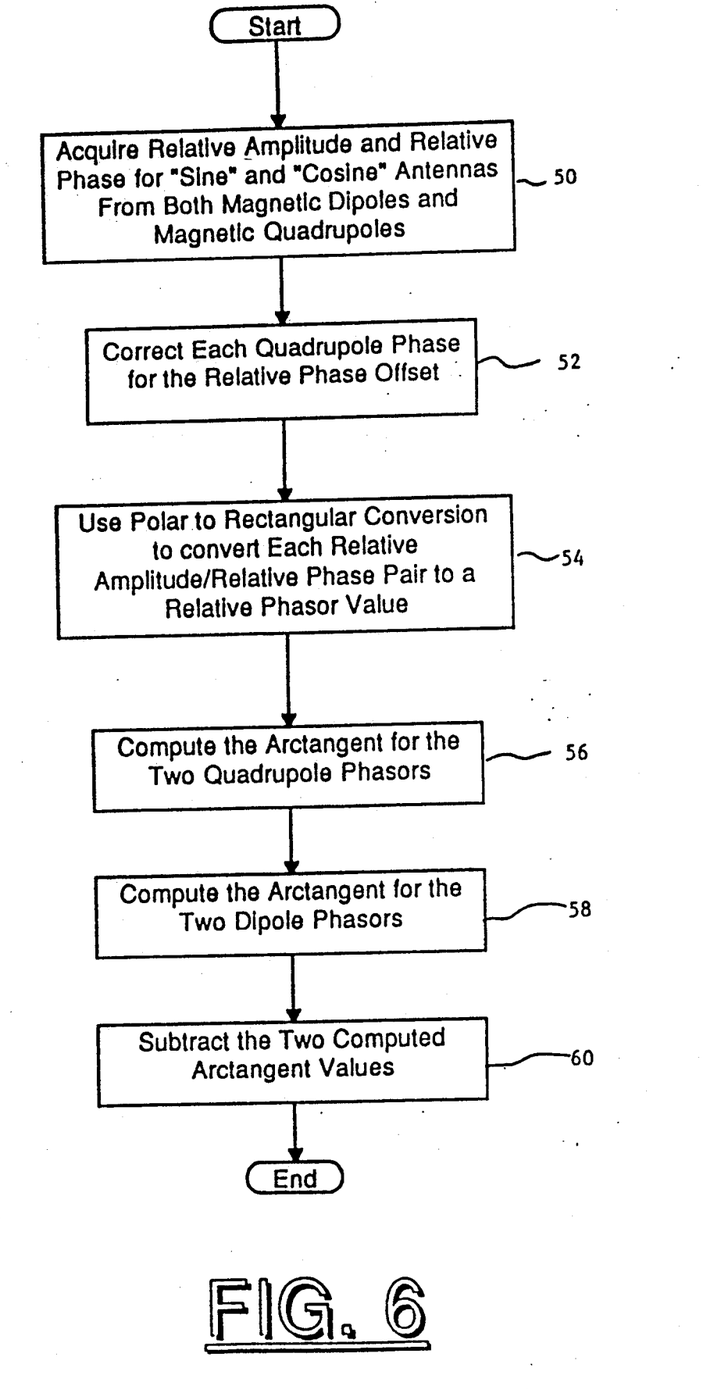
FIG. 6 is a functional flow diagram in accordance with the present invention for obtaining arctangent processing of the magnetic dipole and magnetic quadrupole detected signals.

FIG. 6 is a functional flow chart describing the various steps in the procedure for making the required signal measurements and for processing them to produce the measured direction of arrival. In step 50, the system acquires the relative phase for the sine and the cosine antennas for both the magnetic dipole and the magnetic quadrupole systems. In step 52, the system corrects each quadrupole phase for the relative phase offset. Next, in step 54, a polar to rectangular conversion is performed to convert each relative amplitude/relative phase pair to a relative phasor value. In step 56, the arctangent is computed for the two quadrupole phasors, followed, in step 56, by the computation of the arctangent for the two dipole phasors. Finally, in step 60, the difference between the two computed arctangent values is calculated to yield the measured direction of arrival for the incoming signal.

SOLVING FOR QUADRATURE SUMMATION PHASE DF

The "sine" and "cosine" dipole antenna signals can be combined to provide a quadrature summed dipole output $V_{QD}$ as follows:

$$\begin{aligned} V_{QD} &= V_{DC} + j V_{DS} \\ &= K_D P[\cos(\phi + \gamma) + j \sin(\phi + \gamma)]/\sin\theta \\ &= K_D P\, e^{j(\phi+\gamma)}/\sin\theta \end{aligned} \quad (14)$$

where $j = \sqrt{-1}$ .

Similarly, the "sine" and "cosine" quadrupole antenna signals can be combined to provide a quadrature summed quadrupole output $V_{QQ}$ as follows:

$$\begin{aligned} V_{QQ} &= V_{QC} + j V_{QS} \\ &= K_Q P[\cos(2\phi + \gamma) + j \sin(2\phi + \gamma)] \\ &= K_Q P\, e^{j(2\phi+\gamma)} \end{aligned} \quad (15)$$

The phase difference $\Delta$ between the two quadrature summed outputs is as follows:

$$\begin{aligned}\Delta &= \text{Phase}(V_{QQ}) - \text{Phase}(V_{QD}) \\ &= \text{Phase}(V_{QQ}/V_{QD}) \\ &= \text{Phase}(K_Q \sin\theta\, e^{j\phi}/K_D) \\ &= \phi + \text{Phase}(K_Q/K_D).\end{aligned} \quad (16)$$

The DF bearing $\phi$ can, therefore, be estimated as the measured phase difference between the quadrupole and dipole quadrature outputs compensated by the phase offset between the basic quadrupole and dipole antenna systems (i.e. the phase difference between $K_Q$ and $K_D$). In contrast to the arctangent solution, however, the DF accuracy resulting from the phase measurement of quadrature summed outputs is influenced directly by any inaccuracies in the phase offset.

Figure 7:
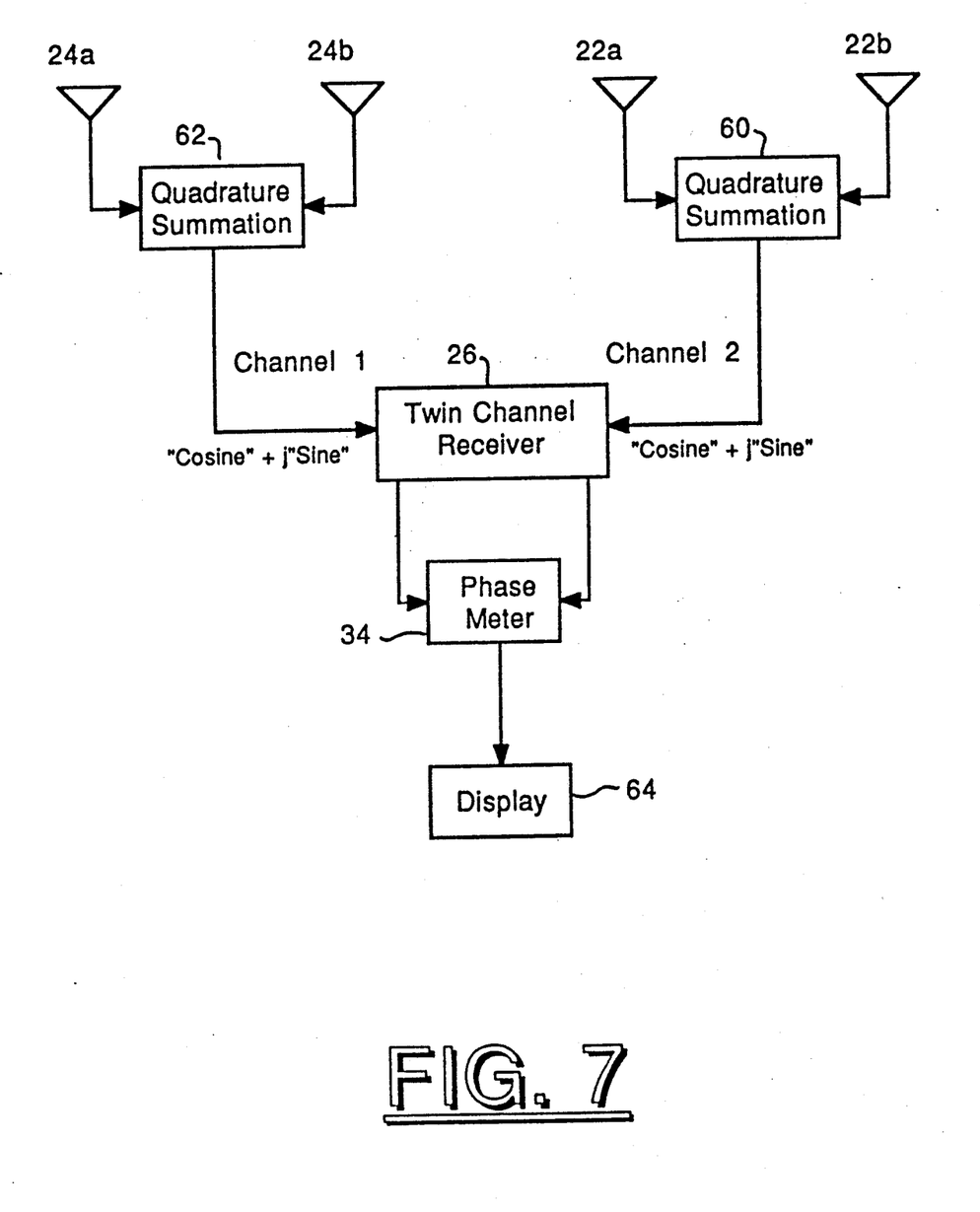
FIG. 7 is a schematic block diagram of the sky wave direction finding system of the present invention using a quadrature summation of magnetic dipoles and a quadrature summation of magnetic quadrupoles.

FIG. 7 is a block diagram of the system hardware to implement the skywave DF system using quadrature combinations of magnetic dipoles and magnetic quadrupoles. Outputs from the magnetic quadrupole antennas 22a and 22b are provided to a quadrature summation circuit 60. Likewise, the outputs of the magnetic dipole antennas 24a and 24b are provided to a quadrature summation circuit 62. The outputs of the respective quadrature summation circuits 60 and 62 are then provided to the input terminals of a twin channel receiver 26. The receiver 26 produces first and second output signals corresponding to the quadrupole array and the dipole array, respectively. These output signals are provided as inputs for a phase meter 34 which measures the relative phase between the signals from each of the arrays. This difference signal is then used as the input to a display which indicates the true bearing and systematic offset between the two signals.

Although the sky wave direction finder of the present invention has been described in connection with the preferred embodiment, it is not intended to be limited to the specific form set forth herein, but on the contrary, it is intended to cover such modifications, alternatives and equivalents as can reasonably be included within the spirit and scope of the claims.

We claim:

1. A system for determining directional information from an incident RF signal, wherein such directional information is substantially free of intrinsic polarization error, the system comprising:

antenna means including a pair of magnetic dipole antennas and a pair of magnetic quadrupole antennas, each respective pair of antennas being connected to provide one or more signal outputs; and means connected to receive said signal outputs to develop said directional information wherein said means connected to receive said signal output is configured to perform a simultaneous arctangent operation on said signal output from said antenna means in accordance with the relationship:

$$\phi = \text{Tan}^{-1}(V_{QS}/V_{QC}) - \text{Tan}^{-1}(V_{DS}/V_{DC})$$

where:

$\phi$ = an unambiguous direction of arrival of said RF signal;

$V_{QS}$ = a complex phasor quantity representing the relative amplitude and phase of an antenna output whose response pattern is $K_Q P \sin(2\phi+\gamma)$;

$K_Q$ = a phasor quantity that describes the relative height and the phase insertion of said second plurality of antennas;

$P = \sqrt{A_O^2 + C^2}$;

$A_O = 0.5 E_h \sin 2\theta$ $C = E_v \sin\theta$;

$E_v$ = a phasor quantity that describes the relative amplitude and phase of a $\theta$ polarized electric field component of the said incident RF signal;

$E_h$ = phasor quantity that describes the relative amplitude and phase of the $\theta$ polarized electric field component of the said incident RF signal;

$V_{QC}$ = a complex phasor quantity representing the relative amplitude and phase of an antenna output whose response pattern is $K_Q P \cos(2\phi+\gamma)$;

$V_{DS}$ = a complex phasor quantity representing the relative amplitude and phase of an antenna output whose response pattern is $K_D P \sin(\phi+\gamma)/\sin\theta$;

$K_D$ = a phasor quantity that describes the relative height and the phase insertion for said first plurality of antennas;

$\gamma = \text{Tan}^{-1}(A_O/C)$; and $V_{DC}$ = a complex phasor quantity representing the relative amplitude and phase of an antenna output whose response pattern is $K_D P \cos(\phi+\gamma)/\sin\theta$.

2. A system for determining directional information from an incident RF signal, wherein such directional information is substantially free of intrinsic polarization error, the system comprising:

antenna means including a pair of magnetic dipole antennas and a pair of magnetic quadrupole antennas, each respective pair of antennas being connected to provide one or more signal outputs; and means connected to receive said signal outputs to develop said directional information wherein said means connected to receive said signal output is configured to perform an estimation of the RF signal direction of arrival, $\phi$, as the measured phase difference between a quadrature summed quadrupole output, $V_{QQ}$, and a quadrature summed dipole output, $V_{QD}$, compensated by the phase offset between the dipole antennas and the quadrupole antennas, said phase offset being the phase difference between $K_Q$ and $K_D$, where:

$V_{QQ} = V_{QC} + j V_{QS}$ $V_{QD} = V_{DC} + j V_{DS}$ $V_{QS}$ = a complex phasor quantity representing the relative amplitude and phase of an antenna output whose response pattern is $K_Q P \sin(2\phi+\gamma)$;

$K_Q$ = a phasor quantity that describes the relative height and the phase insertion of said second plurality of antennas;

$P = \sqrt{A_O^2 + C^2}$;

$A_O = 0.5 E_h \sin 2\theta$ $C = E_v \sin\theta$;

$E_v$ = a phasor quantity that describes the relative amplitude and phase of a $\theta$ polarized electric field component of the said incident RF signal;

$E_h$ = phasor quantity that describes the relative amplitude and phase of the $\theta$ polarized electric field component of the said incident RF signal;

$V_{QC}$ = a complex phasor quantity representing the relative amplitude and phase of an antenna output whose response pattern is $K_Q P \cos(2\phi+\gamma)$;

$V_{DS}$ = a complex phasor quantity representing the relative amplitude and phase of an antenna output whose response pattern is $K_D P \sin(\phi+\gamma)/\sin\theta$;

$K_D$ = a phasor quantity that describes the relative height and the phase insertion for said first plurality of antennas;

$\gamma = \text{Tan}^{-1}(A_O/C)$; and $V_{DC}$ = a complex phasor quantity representing the relative amplitude and phase of an antenna output whose response pattern is $K_D P \cos(\phi+\gamma)/\sin\theta$.

* * * * *